(12) United States Patent
Matsusue

(10) Patent No.: US 8,617,757 B2
(45) Date of Patent: Dec. 31, 2013

(54) FUEL CELL SYSTEM

(75) Inventor: Masaaki Matsusue, Mishima (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/698,818

(22) PCT Filed: May 9, 2011

(86) PCT No.: PCT/IB2011/000971
§ 371 (c)(1),
(2), (4) Date: Nov. 19, 2012

(87) PCT Pub. No.: WO2011/144978
PCT Pub. Date: Nov. 24, 2011

(65) Prior Publication Data
US 2013/0065150 A1    Mar. 14, 2013

(30) Foreign Application Priority Data
May 20, 2010  (JP) ................................. 2010-116015

(51) Int. Cl.
*H01M 8/04* (2006.01)

(52) U.S. Cl.
USPC ........................................................ 429/450

(58) Field of Classification Search
None
See application file for complete search history.

(56) References Cited

U.S. PATENT DOCUMENTS

| | | | |
|---|---|---|---|
| 2001/0028970 A1* | 10/2001 | Sano et al. ...................... | 429/22 |
| 2003/0072980 A1* | 4/2003 | Formanski et al. .............. | 429/13 |
| 2004/0166387 A1 | 8/2004 | Imamura et al. | |
| 2007/0048569 A1* | 3/2007 | Fujita .............................. | 429/22 |
| 2007/0231639 A1* | 10/2007 | Yoshida et al. ................. | 429/22 |
| 2007/0248857 A1* | 10/2007 | Kurosawa ....................... | 429/22 |
| 2008/0187804 A1 | 8/2008 | Arthur et al. | |

FOREIGN PATENT DOCUMENTS

| | | |
|---|---|---|
| JP | 2004-281219 A | 10/2004 |
| JP | 2007-324071 A | 12/2007 |
| JP | 2008-282767 A | 11/2008 |
| JP | 2009-231225 A | 10/2009 |
| JP | 2010-027344 A | 2/2010 |

OTHER PUBLICATIONS

Manabe et al, WO 2009/017139, Fuel Cell System and Its Control Method, Feb. 5, 2009.*

* cited by examiner

*Primary Examiner* — Patrick Joseph Ryan
*Assistant Examiner* — Jose Colucci Rios
(74) *Attorney, Agent, or Firm* — Kenyon & Kenyon LLP

(57) ABSTRACT

A fuel cell system includes a storage device, a fuel cell, a power circuit, a controller, and a memory. The memory stores a favorable combination range in which the combination of a water distribution condition of the fuel cell and the state of charge of the storage device is suitable for the required power of the vehicle, and the controller includes a water distribution condition estimating and acquiring unit that acquires the water distribution condition of the fuel cell, a state-of-charge acquiring unit that acquires the state of charge of the storage device, a combination status determining unit that determines whether the combination of the acquired water distribution condition and the acquired state of charge is within the favorable combination range, and a combination status improving unit that improves the water distribution condition of the fuel cell when the combination is not within the favorable combination range.

9 Claims, 8 Drawing Sheets

FUEL CELL SYSTEM

This is a 371 national phase application of PCT/IB2011/000971 filed 09 May 2011, claiming priority to Japanese Patent Application No. 2010-116015 filed 20 May 2010, the contents of which are incorporated herein by reference.

BACKGROUND OF THE INVENTION

1. Field of the Invention

The invention relates to a fuel cell system, and more particularly to a fuel cell system used along with a storage device.

2. Description of the Related Art

For example, a vehicle installed with a fuel cell is provided with a storage device in addition to the fuel cell, and required electric power is supplied from the storage device when the fuel cell is started, or when electric power required by the vehicle cannot be provided solely by the output of the fuel cell.

In the fuel cell, fuel gas, such as hydrogen, is supplied to an anode side, and oxygen-containing oxidizing gas, such as air, is supplied to a cathode side, so that required electric power is generated by reaction between the fuel gas and the oxidizing gas through an electrolyte membrane. At this time, water is formed as a reaction product on the cathode side. Since the water thus formed permeates through the electrolyte membrane and reaches the anode side, the humidity on the anode side of the electrolyte membrane is increased to an appropriate level, and transport of hydrogen protons through the membrane takes place under the humidity, so that electric power is generated by reaction between the protons and oxygen. Accordingly, it is necessary to control the humidity or moisture content of the electrolyte membrane to an appropriate level, so as to effect power generation with high efficiency. Thus, the output of the fuel cell is affected by a water distribution condition sensed at the electrolyte membrane, and a purging operation or hydrating operation is conducted so as to keep the water distribution condition optimized.

While the storage device repeats charge and discharge, its output characteristics deteriorate due to excessive charge or excessive discharge. Also, the output of the storage device varies with the temperature. Thus, since the output of the storage device has a certain relationship with the state of charge thereof, the state of charge (SOC) of the storage device and the storage device temperature are both managed or controlled.

For example, Japanese Patent Application Publication No. 2008-282767 (JP-A-2008-282767) discloses a fuel cell system in which a purging operation is performed based on measured impedance value and detected SOC value. Also, when the fuel cell is in a normal operating mode, the system performs a purging operation for a set period of time, without taking account of the SOC. When the fuel cell is in a low-temperature operating mode, a purging operation using low-humidity gas is performed for improvement of the startability or starting performance.

Also, Japanese Patent Application Publication No. 2007-324071 (JP-A-2007-324071) discloses a fuel cell system that determines purge conditions based on the amount of water remaining in a fuel cell stack, the temperature of a secondary battery that supplies electric power to an air compressor, and the state of charge of the secondary battery, and controls the amount of purge air supplied from the air compressor.

Also, Japanese Patent Application Publication No. 2004-281219 (JP-A-2004-281219) discloses a fuel cell system that operates normally when the maximum electric power required by a load and accessories cam be supplied from a fuel cell and a secondary battery, and performs a warm-up operation when the maximum power cannot be supplied. Here, the warm-up operation is effected by repeating power generation and halts of the fuel cell, and repeating charge and discharge of the secondary battery.

Thus, in the fuel cell systems of the related art, the output of the fuel cell and the output of the storage device are respectively secured, and a target range of a water distribution condition during operation of the fuel cell and a target range of SOC during operation of the storage device are determined. Also, the output of the storage device is utilized when there is a shortage of the output of the fuel cell during operation, and the storage device is charged with power from the fuel cell when there is a shortage of the output of the storage device. Thus, the required power is allocated to the fuel cell and the storage device.

In the meantime, there is no description in the above-identified publications about effective power allocation between the fuel cell and the storage device when the water distribution condition of the fuel cell or the state of charge of the storage device, which falls outside the target range, is brought to within the target range.

SUMMARY OF THE INVENTION

The invention provides a fuel cell system in which required power can be effectively allocated to a fuel cell and a storage device.

A fuel cell system for a vehicle according to one aspect of the invention includes a water distribution condition estimating unit that estimates and acquires a water distribution condition of a fuel cell, a state-of-charge acquiring unit that acquires a state of charge of a storage device, a determining unit that sets a favorable combination range as a combination range in which a combination of the water distribution condition of the fuel cell and the state of charge of the storage device is suitable for a required power of the vehicle, according to predetermined criteria, and determines whether an actual combination of the acquired water distribution condition and the acquired state of charge is within the favorable combination range, and a combination status improving unit that improves the water distribution condition of the fuel cell using an output of the storage device when the actual combination is not within the favorable combination range, so as to move the actual combination to within the favorable combination range.

In the fuel cell system according to the above aspect of the invention, when the vehicle is started, or runs in a battery running mode with the output of the storage device, and the determining unit determines that the actual combination is such that the state of charge of the storage device is at a sufficient level, but the water distribution condition of the fuel cell is unsatisfactory, the combination status improving unit may improve the water distribution condition of the fuel cell, using the output of the storage device.

In the fuel cell system according to the above aspect of the invention, when the vehicle is in a maximum output condition, or the fuel cell is in a transition from a condition where an operation of the fuel cell is halted to a condition where the operation is resumed, and the determining unit determines that the actual combination is such that the state of charge of the storage device is at an insufficient level, and the water distribution condition of the fuel cell is unsatisfactory, the combination status improving unit may improve the water distribution condition of the fuel cell, using the output of the storage device.

In the fuel cell system according to the above aspect of the invention, when the water distribution condition of the fuel cell is an excessively high humidity condition, the combination status improving unit may operate an air compressor that supplies purge gas. The water distribution condition being in the excessively high humidity condition means that the moisture content is so large that the output characteristic of the fuel cell becomes unsatisfactory, whereas the water distribution condition being in the excessively low humidity condition means that the moisture content is so small that the output characteristic of the fuel cell becomes unsatisfactory.

In the fuel cell system according to the above aspect of the invention, when the water distribution condition of the fuel cell is an excessively low humidity condition, the combination status improving unit may adjust a degree of opening of a back pressure regulating valve of the fuel cell, so as to raise a back pressure of the fuel cell and improve the water distribution condition.

In the fuel cell system according to the above aspect of the invention, when the water distribution condition of the fuel cell is an excessively low humidity condition, the combination status improving unit may control an operation of a coolant circulating pump for the fuel cell, so as to lower the temperature of the fuel cell and improve the water distribution condition.

In the fuel cell system configured as described above, the favorable combination range as a combination range in which the combination of the water distribution condition of the fuel cell and the state of charge of the storage device is suitable for the required power of the vehicle is set according to predetermined criteria, and it is determined whether the actual combination of the actual water distribution condition and state of charge is within the favorable combination range. If the actual combination is not within the favorable combination range, the water distribution condition of the fuel cell is improved using the output of the storage device, so that the actual combination is moved to within the favorable combination range.

While the fuel cell system includes the storage device, the fuel cell may be a main electric power supply in normal operating conditions. With the above configuration, the storage device is effectively used for optimizing the water distribution condition of the fuel cell as the main power supply, or maintaining the optimized water distribution condition. Thus, the fuel cell system including the storage device, as a whole, is able to effectively generate output power, through suitable power allocation between the fuel cell and the storage device.

In the fuel cell system as described above, when the vehicle is started, or runs in a battery running mode with the output of the storage device, and it is determined that the actual combination is such that the state of charge of the storage device is at a sufficient level, but the water distribution condition of the fuel cell is unsatisfactory, the water distribution condition of the fuel cell may be improved, using the output of the storage device. In this manner, the output power of the fuel cell as the main power supply can be raised to a desired level at an early stage.

In the fuel cell system as described above, when the vehicle is in a maximum output condition, or the fuel cell is in a transition from a condition where an operation of the fuel cell is halted to a condition where the operation is resumed, and it is determined that the actual combination is such that the state of charge of the storage device is at an insufficient level, and the water distribution condition of the fuel cell is unsatisfactory, the combination status improving unit may improve the water distribution condition of the fuel cell, using the output of the storage device. In this manner, the output power of the fuel cell as the main power supply can be raised to a desired level at an early stage.

In the fuel cell system as described above, when the water distribution condition of the fuel cell is an excessively high humidity condition, the combination status improving unit may operate the air compressor that supplies purge gas. In this manner, the water distribution condition of the fuel cell can be controlled to within an appropriate range, and the output power of the fuel cell as the main power supply can be raised to a desired level at an early stage.

In the fuel cell system as described above, when the water distribution condition of the fuel cell is an excessively low humidity condition, the combination status improving unit may adjust the opening of the back pressure regulating valve of the fuel cell, so as to raise the back pressure of the fuel cell and improve the water distribution condition. Also, when the water distribution condition of the fuel cell is an excessively low humidity condition, the combination status improving unit may control the operation of the coolant circulating pump for the fuel cell, so as to lower the temperature of the fuel cell and improve the water distribution condition. In these manners, the water distribution condition of the fuel cell can be controlled to within an appropriate range, and the output power of the fuel cell as the main power supply can be raised to a desired level at an early stage.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
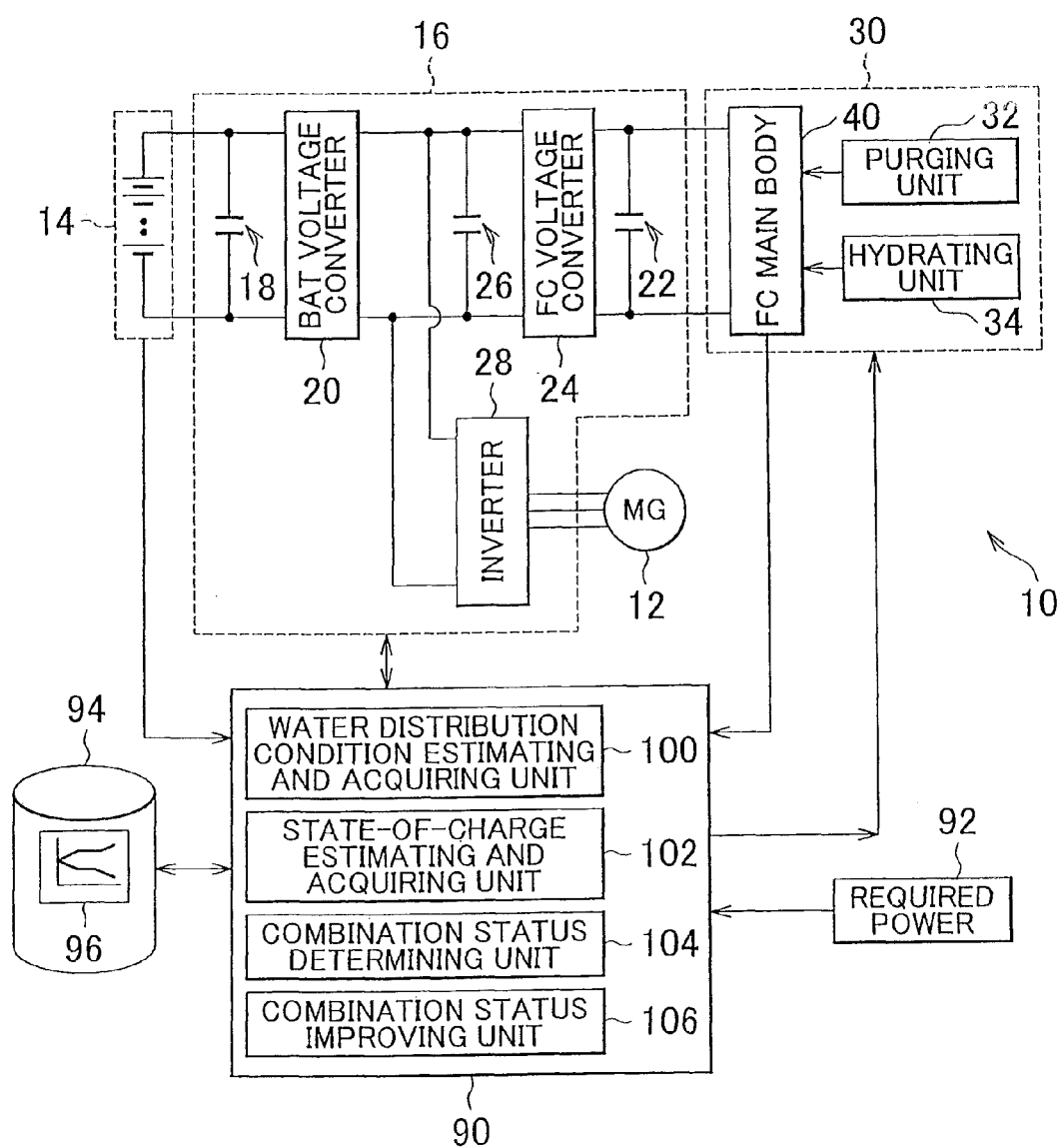
FIG. 1 is a view illustrating the configuration of a fuel cell system according to one embodiment of the invention.

A fuel cell system according to one embodiment of the invention will be described in detail with reference to the drawings. While a piece of dynamo-electric machine will be explained as an external load that utilizes the output of the fuel cell system, the external load may consist of two or more dynamo-electric machines. Also, the external load may include an electrical apparatus or apparatuses other than the dynamo-electric machine(s).

The optimum range and favorable range of a water distribution condition and the optimum range and favorable range of SOC as will be described below are merely exemplary, and may be changed as needed depending on the specifications of the fuel cell system, characteristics of a fuel cell main body, and characteristics of a storage device, for example.

In all of the drawings, the same reference numerals are assigned to the same or corresponding elements, and these elements will not be repeatedly explained. Also, in this specification, the reference numerals that have been used to identify certain elements are used to identify the same or corresponding elements as needed.

FIG. 1 illustrates the configuration of a fuel cell system 10 installed on an electric vehicle. The fuel cell system 10 includes a fuel cell 30 and a storage device 14, which serve as driving power sources, and operates according to a required output 92 of the electric vehicle, so as to supply required electric power to a load. In FIG. 1, a dynamo-electric machine 12 as an external load is illustrated, though it is not a constituent element of the fuel cell system 10.

In this embodiment, the dynamo-electric machine 12 is in the form of a motor-generator (M/G) installed on the vehicle, which is a three-phase synchronization type dynamo-electric machine that functions as a motor when electric power is supplied thereto, and functions as a generator during braking.

The fuel cell system 10 includes the above-mentioned storage device 14 and fuel cell 30, a power circuit 16, a controller 90, and a memory 94.

The storage device 14 is a high-voltage rechargeable/dischargeable secondary battery, and has the function of supplying electric power to a load, for example, when the fuel cell 30 is started, or when the output of the fuel cell 30 is short of or smaller than the electric power required by the load. The load mentioned herein means those installed on the vehicle and operable with electric energy, and includes internal loads, such as an inverter 28, and various accessories included in the fuel cell 30 for use in purging operations and hydrating operations, as well as the dynamo-electric machine 12 as an external load.

As the storage device 14, a lithium-ion battery assembly or a nickel metal hydride battery assembly having a terminal voltage of about 200V to about 300V, or a capacitor, or the like, may be used. The storage device 14, which is a so-called high-voltage battery, is often referred to simply as a battery. Thus, the storage device 14 will be denoted as "battery" or "BAT" as needed.

The storage device temperature as the temperature of the storage device 14 and SOC data indicating the state of charge of the storage device 14 are transmitted via suitable signal lines to the controller 90. The SOC may be represented by a value calculated by monitoring charge current that flows into the storage device 14, and discharge current that flows out of the storage device 14.

A BAT voltage converter 20 in the power circuit 16 is a battery voltage converter that is provided between the storage device 14 and the load, and performs voltage level conversion between the terminal voltage of the storage device 14 and the voltage of the load side. Here, BAT means battery. The BAT voltage converter 20 includes a reactor and a switching device.

An FC voltage converter 24 is a fuel cell voltage converter that is provided between the fuel cell 30 and the load, and performs voltage level conversion between the terminal voltage of the fuel cell 30 and the voltage of the load side. Here, FC means fuel cell. The FC voltage converter 24 includes a reactor and a switching device.

The inverter 28 is a circuit having the function of converting high-voltage dc power into ac power as three-phase driving power, and supplying the ac power to the dynamo-electric machine 12, and the function of converting ac power as three-phase regenerative power received from the dynamo-electric machine 12 into high-voltage dc charging power. The inverter 28 may consist of a circuit including a switching device(s), diode(s), and so forth.

Smoothing capacitors 18, 22, 26 are capacitive elements for reducing fluctuations in voltage and current of the storage device 14, fuel cell 30, and the inverter 18 for smoothing.

Figure 2:
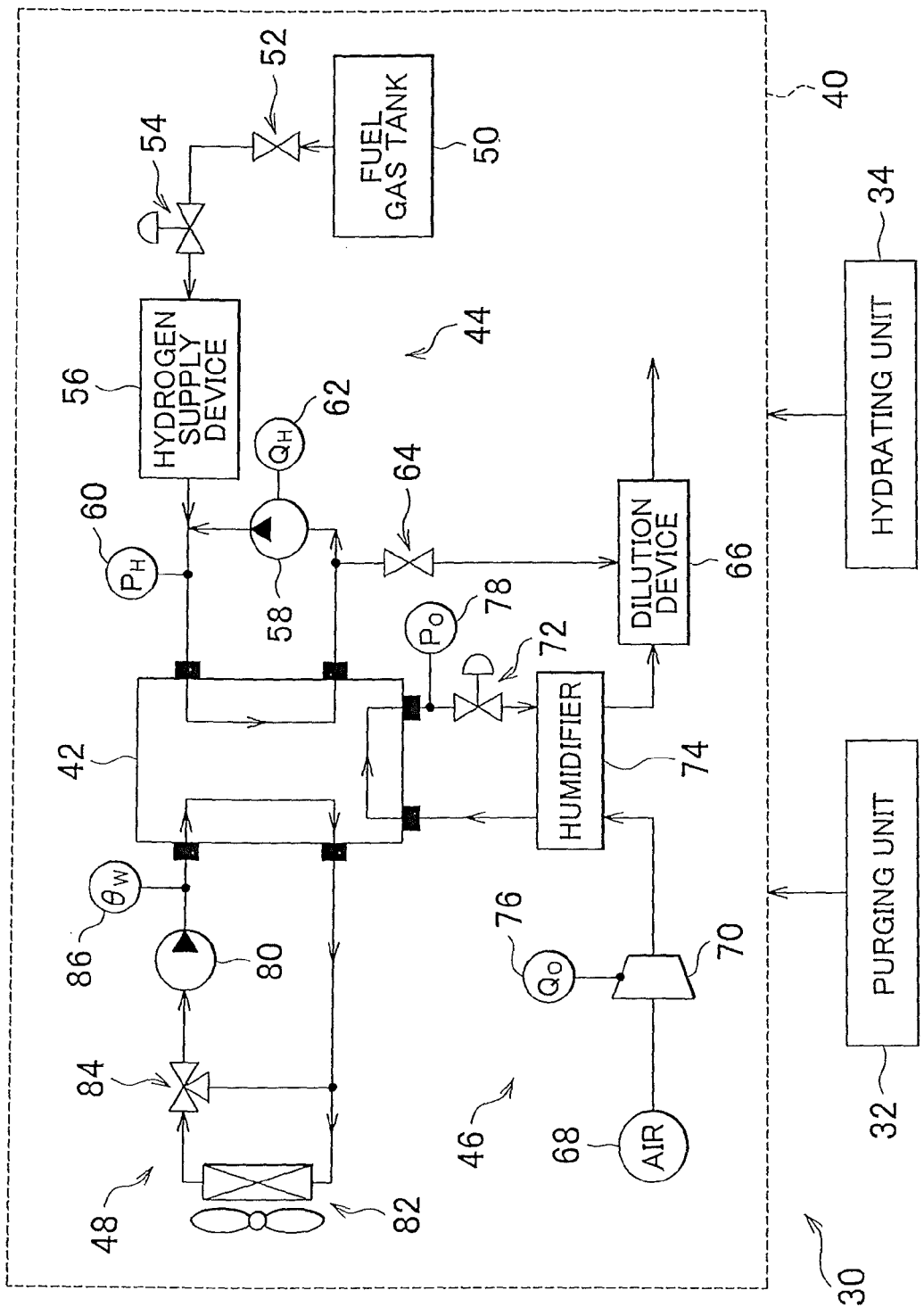
FIG. 2 is a view illustrating the configuration of a fuel cell main body in the fuel cell system of FIG. 1.

The fuel cell 30 includes an FC main body 40, a purging unit 32, and a hydrating unit 34. FIG. 2 is a view useful for explaining the configuration of the fuel cell 30. The FC main body 40 includes a fuel cell stack 42, and various accessories needed for its operation.

The fuel cell stack 42 is a type of battery assembly formed by combining a plurality of fuel cells (i.e., unit cells), such that high-voltage electric power of about 200V to about 300V can be taken out of the fuel cell stack 42. Each of the fuel cells has an anode side to which fuel gas, such as hydrogen, is supplied, a cathode side to which oxidizing gas, such as air, is supplied, and an electrolyte membrane in the form of a solid polymer membrane through which electrochemical reaction occurs so as to provide required electric power.

Various accessories are roughly classified into accessories that constitute a fuel gas supply system 44, accessories that constitute an oxidizing gas supply system 46, and accessories that constitute a cooling system 48.

The fuel gas supply system 44 is a gas supply unit having the function of supplying the fuel cell stack 42 with fuel gas needed for its operation, at appropriate pressure and flow rate. The fuel gas supply system 44 includes an inlet-side channel portion in which fuel gas is supplied from a fuel gas tank 50 charged with high-pressure hydrogen gas, to an input port of the fuel cell stack 42, via a shut-off valve 52, a regulating valve 54 that roughly regulates the pressure and the flow rate, and a hydrogen supply device 56 that regulates the pressure and flow rate of the fuel gas to appropriate values, and an outlet-side channel portion through which off-gas that has passed through the fuel cell stack 42 and is discharged from an output port of the fuel cell stack 42 flows.

A gas-liquid separator (not shown) is provided in the outlet-side channel, for separating off-gas that has been used in the fuel cell stack 42 and contains water vapor into hydrogen gas and water-containing impurity gas. A hydrogen pump 58 provided in a circulation channel that connects the outlet-side channel with the inlet-side channel is a circulating pump that returns the hydrogen gas fed from the gas-liquid separator back into the inlet-side channel. The water-containing impurity gas fed from the gas-liquid separator is fed to a dilution device 66 via a shut-off valve 64 that is opened and closed at appropriate times, and is diluted with off-gas received from the oxidizing gas supply system 46, to be discharged to the outside.

The oxidizing gas supply system 46, is a gas supply unit having the function of supplying the fuel cell stack 42 with oxidizing gas needed for its operation, at appropriate pressure and flow rate. The oxidizing gas supply system 46 uses outside air denoted as AIR 68 as a source of supply, and includes an inlet-side channel portion in which oxidizing gas is supplied to an input port of the fuel cell stack 42, via a suitable filter (not shown), ACP 70 as an air compressor, and a humidifier 74, and an outlet-side channel portion through which off-gas that has passed through the fuel cell stack 42 and is discharged from an output port of the fuel cell stack 42 flows.

With the above arrangement, hydrogen gas as fuel gas and pressurized air as oxidizing gas are supplied to the fuel cell stack 42. These gases electrochemically react with each other via the electrolyte membrane, to generate heat, produce water as a reaction product, and generate electromotive force. As a result, electric power is generated, and the power thus generated is output to the FC voltage converter 24, as output power of the fuel cell 30.

A back pressure regulating valve 72 provided in the outlet-side channel portion of the oxidizing gas supply system 46 is operable to restrict or regulate the pressure of the oxidizing gas in the fuel cell stack 42. A water-containing off-gas as a reaction product that has passed through the back pressure regulating valve 72 is fed as humidifying gas to the humidifier 74, so as to humidify the oxidizing gas flowing through the inlet-side channel portion. The off-gas discharged from the humidifier 74 after the humidification is fed to the dilution device 66.

The cooling system 48 has the function of circulating a coolant so as to keep the fuel cell stack 42 at an operating temperature suitable for electrochemical reactions. The cooling system 48 includes a coolant circulating pump 80, a radiator 82, and a cross valve 84 for controlling the flow rate of the coolant directed toward the radiator 82.

As shown in FIG. 2, pressure gauges 60, 78, flow meters 62, 76, and a temperature gauge 86 are provided for measuring the hydrogen gas input pressure $P_H$, flow rate $Q_H$ of hydrogen gas returned by the hydrogen pump 58, oxygen gas flow rate $Q_O$, oxidizing gas pressure $P_O$ regulated by the back pressure regulating valve 72, and the coolant temperature $\theta_W$.

The purging unit 32 and the hydrating unit 34 provide a control unit having the function of controlling operations of the above-indicated various accessories, so as to achieve an appropriate water distribution condition of the fuel cell stack 42. As described above, the electrolyte membranes included in the fuel cell stack 42 are required to have a suitable humidity in order to enable the fuel cell 30 to generate power. The above-mentioned water distribution condition of the fuel cell stack 42 indicates the humidity measured at the electrolyte membrane, or the moisture content of the electrolyte membrane.

Values representing the water distribution condition can be obtained by measuring the impedance of the fuel cell stack 42. For example, a value corresponding to the moisture content indicating the water distribution condition can be obtained by applying an appropriate ac signal to an output terminal of the fuel cell stack 42, and measuring the impedance of the fuel cell stack 42 with the ac signal. The thus obtained data of moisture content indicating the water distribution condition is transmitted via a suitable signal line to the controller 90.

When the water distribution condition of the fuel cell stack 42 is an excessively high humidity condition, namely, when the moisture content is so large that the output characteristics of the fuel cell stack 42 are not satisfactory, the purging unit 32 controls the operation of an accessory or accessories for purging water from the fuel cell stack 42. For example, the rotational speed of the ACP (air compressor) 70, or the like, is increased, so as to increase the amount of the oxidizing gas supplied to the fuel cell stack 42. In this case, a suitable channel that bypasses the humidifier 74 may be provided, and a large amount of dry oxidizing gas may be fed to the fuel cell stack 42 via the bypass channel. Thus, the purging operation can be performed by controlling the operation of the ACP 70 so as to increase the flow rate and pressure of the oxidizing gas supplied to the fuel cell stack 42. When the moisture content of the the fuel cell stack 42 is higher than 60%, water distribution condition may be regarded as an excessively high humidity condition.

When the water distribution condition of the fuel cell stack 42 is an excessively low humidity condition, namely, when the moisture content is so small that the output characteristics of the fuel cell stack 42 are not satisfactory, the hydrating unit 34 controls the operation of an accessory or accessories for increasing the moisture content of the fuel cell stack 42. For example, control for restricting flow of the oxidizing gas is performed by adjusting the opening of the back pressure regulating valve 72, and raising the back pressure of the fuel cell stack 42. Thus, if the flow of the oxidizing gas is sufficiently restricted, a sufficient amount of humidified oxidizing gas that has passed through the humidifier 74 remains in the fuel cell stack 42, whereby the moisture content can be increased.

The moisture content may also be increased by increasing the rotational speed of the coolant circulating pump 80 so as to increase the flow rate of the coolant fed into the fuel cell stack 42. As the coolant flow rate increases, the temperature of the fuel cell stack 42 is lowered, and the humidity within the fuel cell stack 42 can be increased. When the moisture content of the fuel cell stack 42 is lower than 40%, water distribution condition may be regarded as an excessively low humidity condition.

The moisture content may also be increased by increasing the rotational speed of the hydrogen pump 58, so as to increase the amount of hydrogen gas fed from the output port of the fuel gas supply system 44 back into the inlet-side channel. In this manner, water contained in the hydrogen gas at the anode side can be returned to the cathode side, so that the moisture content of the fuel cell stack 42 can be increased.

Referring back to FIG. 1, the controller 90 controls the operations of respective elements that constitute the fuel cell system 10 as a whole, according to the required output 92 as a command received from a vehicle control system (not shown). In this connection, the required output 92 is a value obtained by converting electric power required by all of the electric apparatuses installed on the vehicle during operation of the vehicle, into the output of the fuel cell system 10. More specifically, the required electric power includes power required by the dynamo-electric machine 12 for running the vehicle, power required by the power circuit 16 connected to the dynamo-electric machine 12, power required by various accessories that constitute the fuel cell 30, and power required by an air conditioner, audio equipment, small motors, control circuits, and so forth.

In addition to the above-described comprehensive control function, the controller 90 has, in particular, the function of controlling the effective allocation of the output or power to the fuel cell 30 and the storage device 14, in view of the water distribution condition of the fuel cell 30 and the state of charge of the storage device 14. The controller 90 may consist of a computer suitable for installation on the vehicle.

The controller 90 includes a water distribution condition estimating and acquiring unit 100 that estimates and acquires a water distribution condition of the fuel cell 30, a state-of-charge estimating and acquiring unit 102 that acquires the state of charge of the storage device 14, a combination status determining unit 104, and a combination status improving unit 106. The combination status determining unit 104 sets a favorable combination range as a combination range within which the combination of the water distribution condition of the fuel cell 30 and the state of charge of the storage device 14 is suitable for the required power of the vehicle, according to predetermined criteria, and determines whether the actual combination of the acquired water distribution condition and the acquired state of charge is within the favorable combination range. If the actual combination is not within the favorable combination range, the combination status improving unit 106 improves the water distribution condition of the fuel cell 30, using the output of the storage device 14, so that the actual combination is moved to within the favorable combination range.

The above-described functions can be implemented by software, more specifically, by executing a fuel cell system control program. A part of these functions may be implemented by hardware.

The memory 94 connected to the controller 90 stores the fuel cell system control program, and also stores, in particular, the favorable combination range 96 as a combination range within which the combination of the water distribution condition of the fuel cell 30 and the state of charge of the storage device 14 is suitable for the required power of the vehicle. A suitable memory may be used as the memory 94.

Figure 3:
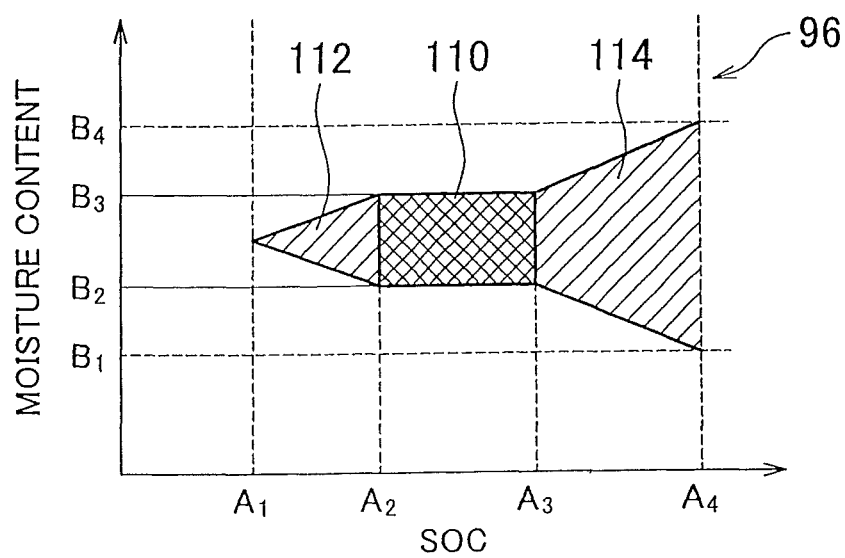
FIG. 3 is a view useful for explaining a favorable combination range as a combination range in which the combination of the water distribution condition of the fuel cell and the state of charge of the storage device is suitable for the required power of the vehicle, in the fuel cell system of FIG. 1.

FIG. 3 shows one example of the favorable combination range 96. The favorable combination range 96 of this example is indicated by a hatched area in the map of FIG. 3 in which the horizontal axis indicates SOC that represents the state of charge of the storage device 14, and the vertical axis indicates the moisture content that represents the water distribution condition of the fuel cell 30. A further favorable range included in the favorable range is denoted as an optimum range, which is indicated by a double hatched area in the map of FIG. 3. While the memory 94 stores the favorable combination range, etc. in the form of the map as shown in FIG. 3, the memory 94 may store the favorable range in the form of binary output (1 or 0) indicating whether the received combination of the moisture content and the SOC is within the favorable range, or in the form of mathematical expressions representing boundaries between the favorable range and regions other than the favorable range. Incidentally, the optimum range is a range where the water distribution condition of the fuel cell 30 is within a recommended operating range and the state of charge of the storage device is within a recommended operating range.

In FIG. 3, the range of the SOC is divided into five regions, which are defined by values of $A_1$, $A_2$, $A_3$, $A_4$ as boundaries. Of these regions, the region between $A_2$ and $A_3$ is a SOC range designated as a recommended operating range of the storage device 14 according to the related art. Although the region between $A_1$ and $A_2$ and the range between $A_3$ and $A_4$, which are outside the region between $A_2$ and $A_3$, are not recommended operating ranges of the storage device 14, they are permissible operating ranges in which the storage device 14 is operable without deteriorating its characteristics. The region below $A_1$ and the region above $A_4$ are inhibited operating ranges in which the characteristics of the storage device 14 may deteriorate.

For example, if the recommended operating range of the SOC is from 40% to 60%, the permissible operating range may be set to a range from 30% to 70%. It is to be understood that these numbers are merely exemplary and are provided for the sake of explanation.

Also, the range of the moisture content is divided into five regions, which are defined by values of $B_1$, $B_2$, $B_3$, $B_4$ as boundaries. Of these regions, the region between $B_2$ and $B_3$ is a range of moisture content designated as a recommended operating range of the fuel cell 30 according to the related art. Although the region between $B_1$ and $B_2$ and the region between $B_3$ and $B_4$, which are outside the region between $B_2$ and $B_3$, are not recommended operating ranges of the fuel cell 30, they are permissible operating ranges in which the fuel cell 30 is operable without deteriorating its the characteristics. The region below $B_1$ and the region above $B_4$ are inhibited operating ranges in which the characteristics of the fuel cell 30 may deteriorate.

While values of the moisture content vary depending on the definition thereof or method of measuring the moisture content, the percentage of moisture content defined by certain criteria may be used as the moisture content. If the thus defined moisture content is used, the permissible operating range of the moisture content may be set to 30% to 70% where the recommended operating range is 40% to 60%, for example. It is to be understood that these numbers are merely exemplary and are provided for the sake of explanation.

According to the related art, the region where the SOC ranges from $A_2$ and $A_3$ and the moisture content ranges from $B_2$ to $B_3$ is regarded as the recommended operating range 110 of the fuel cell system. In FIG. 3, a lower-SOC-side operating range 112 and a higher-SOC-side operating range 114 are set outside the recommended operating range 110. The lower-SOC-side operating range 112 is a region in which the SOC is low, but the moisture content is within the recommended operating range. In this region, the fuel cell system is able to meet the required power by compensating for a shortage of the output of storage device 14, with the output of the fuel cell 30. The higher-SOC-side operating range 114 is a region in which the SOC is sufficiently high, but the moisture content is outside the recommended operating range. In this region, the fuel cell system is able to meet the required power by compensating for a shortage of the output of the fuel cell 30, with the output of the storage device 14.

As is understood from the above description, the favorable range 96 of the combination of the water distribution condition of the fuel cell 30 and the state of charge of the storage device 14 is a range obtained by adding the lower-SOC-side operating range 112 and the higher-SOC-side operating range 114 to the recommended operating range 110 of the related art. The optimum range, which is a further preferable range in the favorable range, is the recommended operating range 110. If the above-mentioned combination is within the favorable range, the fuel cell system is able to meet the required power by appropriately determining the proportion between the output of the, fuel cell 30 and the output of the storage device 14, without causing deterioration in the characteristics of the fuel cell 30 and causing deterioration in the characteristics of the storage device 14.

Figure 4:
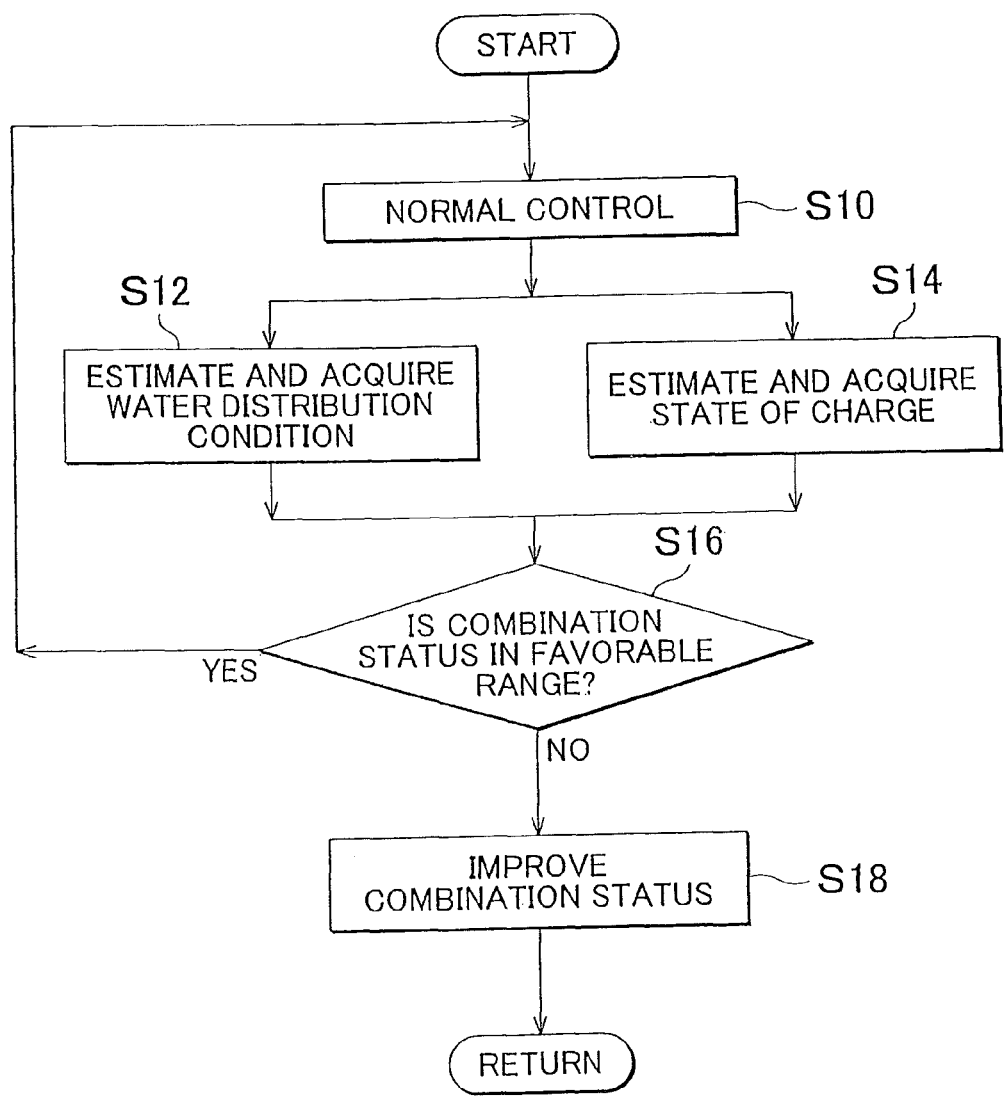
FIG. 4 is a flowchart illustrating the procedure of effective power allocation between the fuel cell and the storage device, in the fuel cell system of FIG. 1.

The operation of the system configured as described above, in particular, each function of the controller 90, will be described with reference to FIG. 4. FIG. 4 is a flowchart illustrating a procedure of effectively allocating the required power to the fuel cell 30 and the storage device 14. Each step of the procedure of FIG. 4 corresponds to each step of the fuel cell system control program.

Under normal circumstances, the fuel cell system 10 performs normal control under which the system 10 operates in the recommended operating range 110 (S10). Even while the fuel cell system 10 is operating in this range, the water distribution condition of the fuel cell 30 and the state of charge of the storage device 14 change from moment to moment; therefore, an estimated value of water distribution condition and an estimated value of the state of charge are acquired at suitable time intervals (S12, S14). These steps are respectively executed by the water distribution condition estimating and acquiring unit 100 and state-of-charge estimating and acquiring unit 102 of the controller 90. More specifically, the controller 90 acquires moisture content data representing the water distribution condition, which is transmitted from the fuel cell 30, and SOC data representing the state of charge, which is transmitted from the storage device 14.

Then, it is determined whether the actual combination of the moisture content indicative of the acquired water distribution condition and the SOC indicative of the acquired state of charge is within the favorable combination range (S16). This step is executed by the combination status determining unit 104 of the controller 90. More specifically, the combination status determining unit 104 reads or retrieves the favorable combination range 96 stored in the memory 94, and determines whether the acquired combination of the actual moisture content and SOC is within the recommended operating range 110, lower-SOC-side operating range 112, or the higher-SOC-side operating range 114, as explained above with reference to FIG. 4. If the combination of the actual moisture content and SOC is within any of these ranges, it is determined that the combination is a favorable combination, and the control returns to step S10.

If the combination of the actual moisture content and SOC is not within any of the recommended operating range 110, lower-SOC-side operating range 112, and the higher-SOC-side operating range 114, an operation to improve the combination status is performed (S18). This step is executed by the combination status improving unit 106 of the controller 90. More specifically, the combination status improving unit 106 improves the water distribution condition of the fuel cell 30, using the output of the storage device 14, so that a point indicating the actual combination is moved to a point within the favorable combination range. If the actual combination is already within the favorable range but not within the optimum range, an operation to further improve the water distribution combination of the fuel cell 30 is performed. Once the operation of step S18 is finished, the control returns to step S10, and the above-described procedure is repeated at fixed time intervals.

Examples of the combination status improving operation will be described with reference to FIG. 5A through FIG. 9. In an example of FIG. 5A through FIG. 7, the actual combination is in the vicinity of the lower-SOC-side operating range 122 where the state of charge of the storage device 14 is not satisfactory, and the water distribution condition of the fuel cell 30 is also not satisfactory. In an example of FIG. 8A, FIG. 8B and FIG. 9, the actual combination is within the higher-SOC-side operable range 114 where the state of charge of the storage device 14 is good, but the water distribution condition of the fuel cell 30 is not satisfactory.

Figure 5A:
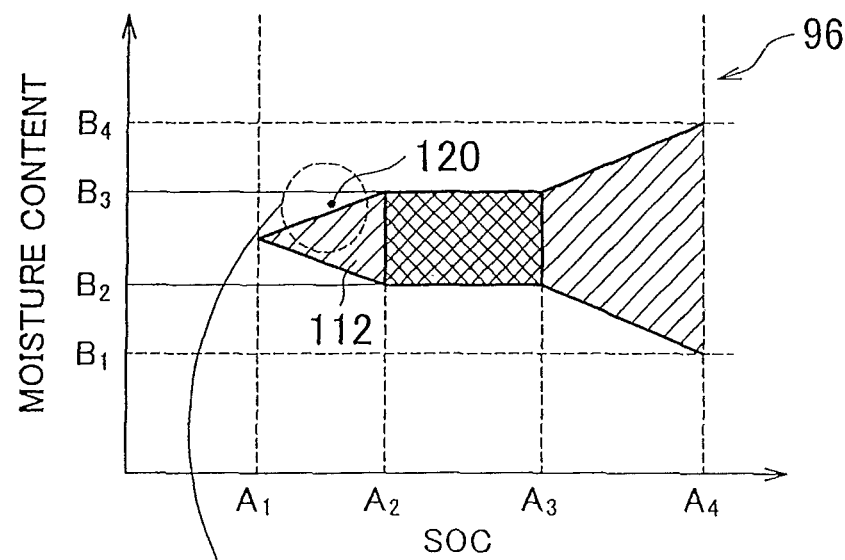
FIG. 5A and FIG. 5B are views useful for explaining the manner of effectively allocating the required output to the fuel cell and the storage device when the vehicle is in the maximum output condition, or when the fuel cell is in a transition from a condition where its operation is halted to a condition where its operation is resumed, in the fuel cell system of FIG. 1.
Figure 5B:
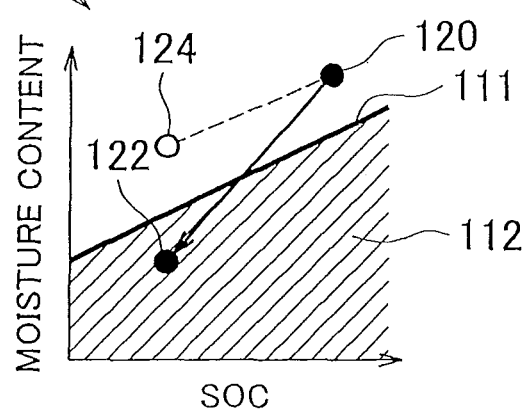

FIG. 5A shows the case where the state of charge of the storage device 14 is not satisfactory, and the water distribution condition of the fuel cell 30 is also not satisfactory. FIG. 5B is an enlarged view of a portion of the lower-SOC-side operating range 112 of the favorable combination range 96, wherein an operating point 120 represents the current conditions. Reference numerals 122, 124 denote operating points to which the operating point 120 is moved when the required power is allocated to the fuel cell 30 and the storage device 14. The operating point 120 is moved to the operating point 122 according to the procedure of FIG. 4, and is moved to the operating point 124 according to the related art, which is shown in FIG. 5B for comparison.

As shown in FIG. 5A and FIG. 5B, the current operating point 120 is outside the lower-SOC-side operating range 112. Namely, if the operating point 120 is viewed alone, it indicates that the moisture content of the fuel cell 30 is within the range of $B_2$ and $B_3$, and is thus in a sufficient condition, but the state of charge (SOC) of the storage device 14 is not at a sufficient level. When compared with the favorable combination range 96, the operating point 120 is outside the preferable combination range 96, and the fuel cell system is not able to generate the required power 92, i.e., power as desired or requested by the user. Examples of this case include, for example, the case where the vehicle is in the maximum output condition, or the case where the fuel cell 30 is in a transition from a condition where the operation of the fuel cell 30 is halted or stopped, to a condition where the fuel cell operation is resumed.

When the accelerator pedal is fully depressed (Wide_Open_Throttle (WOT)), as an example of the maximum output condition of vehicle, the output of the storage device 14 compensates for a shortage of the output of the fuel cell 30 relative to the required power 92. At this time, if the SOC of the storage device 14 is smaller than $A_2$, the overall output power of the fuel cell system 10 may not meet the required power 92 even when the moisture content of the fuel cell 30 is between $B_2$ and $B_3$.

When the fuel cell 30 ceases to perform an intermittent operation, as an example where the fuel cell 30 is in a transition from a halt of its operation to resumption thereof, the moisture content of the fuel cell 30 may be in the vicinity of $B_2$ or in the vicinity of $B_3$ since the fuel cell 30 has been kept in the condition where its operation is halted.

In these cases, it is said, as viewed from the output condition of the fuel cell system 10 as a whole, that the state of charge of the storage device 14 is not at a sufficient level, and the water distribution condition of the fuel cell 30 is also not satisfactory. Namely, as compared with the favorable combination range 96, the operating point 120 representing the combination of the moisture content and the SOC lies outside the lower-SOC-side operating range 112.

According to the related art, the operation of the fuel cell 30 may be continued since the moisture content of the fuel cell 30 is between $B_2$ and $B_3$. In this case, while the moisture content of the fuel cell 30 gradually gets close to a middle point between $B_2$ and $B_3$, the SOC of the storage device 14 becomes lower and lower since power generated from the storage device 14 is spent by accessories, or the like, and it becomes difficult for the operating point to reach the lower-SOC-side operating range 112. The operating point 124 shown in FIG. 5B represents such a condition established according to the related art.

According to the procedure of FIG. 4, an operation to improve the combination status is performed in step S18. Here, the water distribution condition of the fuel cell 30 is improved, using the output of the storage device 14, so that the operating point 120 indicating the actual combination is moved to the operating point 122 within the favorable combination range 112, as described above. Namely, in this example, the output of the storage device 14 is intensively used early so as to perform a purging operation on the fuel cell 30. The purging operation, which is executed by the purging unit 32, includes the step of increasing the rotational speed of the ACP (air compressor) 70, as described above. If the fuel cell system reaches the operating point 122, which is within the favorable combination range 96, the system is able to generate power equivalent to the required power 92, and the power as desired by the user is obtained, thus assuring improved driveability.

Figure 6:
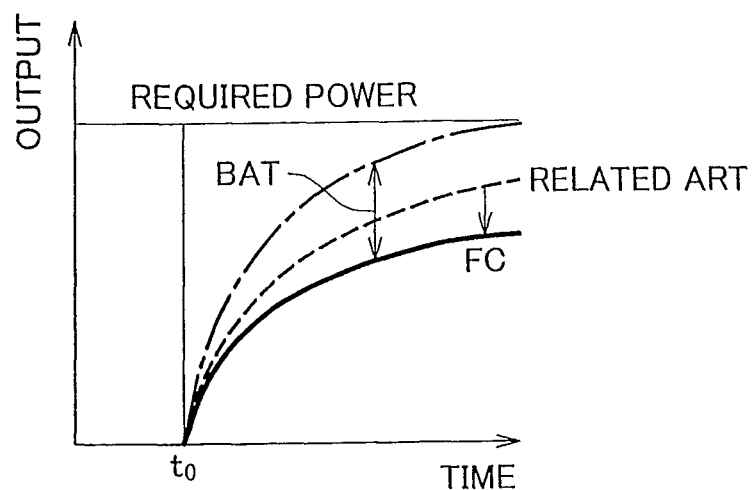
FIG. 6 is a view useful for explaining one example of power allocating method in the case of FIG. 5A.
Figure 7:
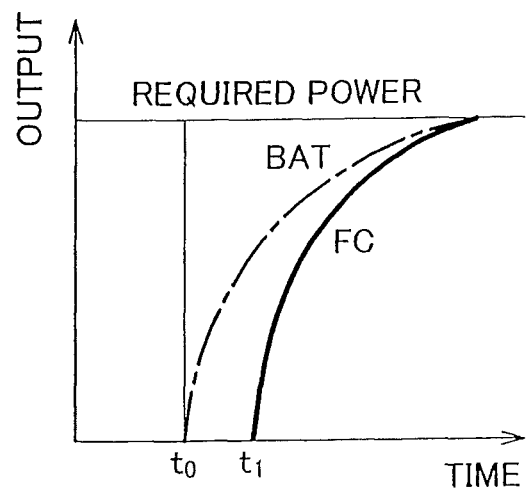
FIG. 7 is a view useful for explaining another example of power allocating method in the case of FIG. 5A.

While the purging operation may be conducted by directly using the output of the storage device 14, the purging operation may be carried out while a certain proportion of the required power 92 is provided by the storage device 14. FIG. 6 and FIG. 7 show two specific examples of such operation of the fuel cell system.

FIG. 6 shows an example in which the output level of the fuel cell 30 is lowered, and the storage device 14 compensates for a shortage of the output power due to the reduction of the output level of the fuel cell 30. In FIG. 6, "FC" denotes the output of the fuel cell 30, and "BAT" denotes the output of the storage device 14. Thus, the output level of the fuel cell 30 is lowered, so that the amount of water discharged to the outside becomes larger than the amount of water formed by the electrochemical reaction, whereby a purging operation is substantially performed on the fuel cell 30. In this example, the output of the storage device 14 is intensively and effectively used at an early stage for making up for a shortage of the output power relative to the required power 92, while at the same time the purging operation is performed on the fuel cell 30, so that the operating point is moved to a point within the favorable combination range 96.

FIG. 7 shows an example in which a purging operation is carried out before power is generated from the fuel cell 30, and, during the purging operation, the required power 92 is provided solely by the storage device 14. In this example, the output of the storage device 14 is intensively and effectively used at an early stage for providing the entire required power 92, while at the same time the purging operation is performed on the fuel cell 30, so that the operating point is moved to a point within the favorable combination range 96.

In the example of FIG. 5A and FIG. 5B, the operating point 120 is located in a larger-moisture-content region on one side of a larger-moisture-content boundary 111 of the lower-SOC-side operating range 112 on which the moisture content is larger than that on the other side. In this case, the output of the storage device 14 is intensively used early for performing a purging operation on the fuel cell 30. To the contrary, if the operating point 120 is located in a smaller-moisture-content region on one side of a smaller-moisture-content boundary of the lower-SOC-side operating range 112 on which the moisture content is smaller than that on the other side, the output of the storage device 14 is intensively used early for performing a hydrating operation on the fuel cell 30. The hydrating operation is implemented by the hydrating unit 34. For example, the opening of the back pressure regulating valve 72 is adjusted, or the operation of the coolant circulating pump is controlled.

Figure 8A:
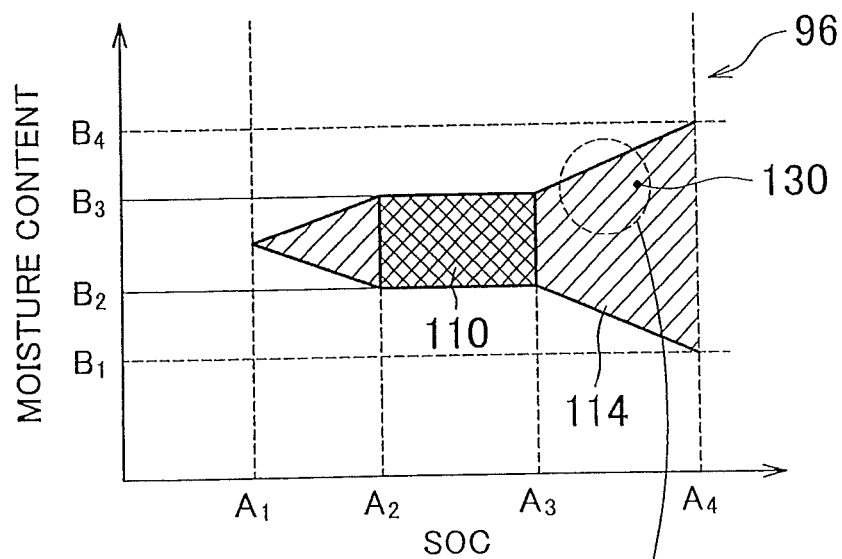
FIG. 8A and FIG. 8B are views useful for explaining the manner of effectively allocating the required power to the fuel cell and the storage device when the vehicle is started, or when the vehicle runs in a battery running mode with the output of the storage device, in the fuel cell system of FIG. 1.
Figure 8B:
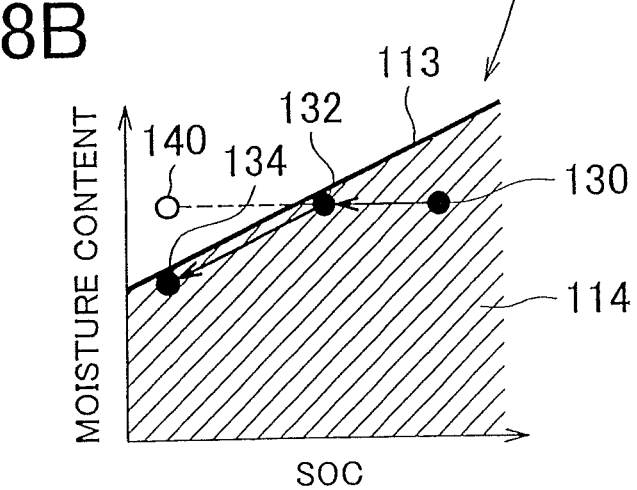

Next, FIG. 8A shows the case where the state of charge of the storage device 14 is good, but the water distribution condition of the fuel cell 30 is not satisfactory. FIG. 8B is an enlarged view of a portion of the higher-SOC-side operating range 114 of the favorable combination range 96, wherein an operating point 130 represents the current conditions. Reference numerals 132, 134 and 140 denote operating points to which the operating point 130 is moved when the required power is allocated to the fuel cell 30 and the storage device 14, as will be discussed below. The operating point 130 is moved to the operating points 132, 134 according to the procedures of FIG. 4, and is moved to the operating point 140 according to the related art, which is shown in FIG. 8B for comparison.

As shown in FIG. 8A and FIG. 8B, the current operating point 130 lies within the higher-SOC-side operating range 114. However, if the operating point 130 is viewed alone, it indicates that the moisture content of the fuel cell 30 exceeds $B_3$, and is not in the optimum range as the recommended operating range, and the SOC as the state of charge of the storage device 14 is at a sufficiently high level, but is not within the optimum range as the recommended operating range. When compared with the favorable combination range 96, the operating point 130 is within the favorable combination range 96, but is located outside the recommended operating range 110 as the optimum combination range, which means that the operating efficiency of the fuel cell 30 is not necessary in the best condition. From the viewpoint of the user, the fuel cell system may not be able to generate the required power 92, or power as desired by the user. Examples of this case include, for example, the case where the vehicle is started, or the case where the vehicle is in the battery running mode in which the vehicle runs with the output of the storage device 14.

When the vehicle is started, the storage device 14 has been sufficiently charged by the fuel cell 30, and the SOC may exceed $A_3$. Since the vehicle speed is low when the vehicle starts, it has been found preferable to drive the vehicle with the output of the storage device 14, rather than driving the vehicle with the fuel cell 30, for the higher efficiency of the fuel cell system 10 as a whole. Accordingly, the fuel cell 30 is not operated, and therefore, the moisture content may exceed the optimum range between $B_2$ and $B_3$. In this case, the vehicle can be started, but there is room for further improvement in terms of the moisture content of the fuel cell 30.

Similarly, in the case where the vehicle shifts from the battery running mode in which the vehicle runs with the output of the storage device 14, like when the vehicle is started, to the FC running mode in which the vehicle runs with the output of the fuel cell 30, the SOC of the storage device 14 is at a sufficiently high level, but there is room for further improvement in terms of the moisture content of the fuel cell 30.

In the above-described cases, the combination represented by the operating point 130 indicates that the state of charge of the storage device 14 is satisfactory, but the water distribution condition of the fuel cell 30 is not satisfactory, as viewed from the output condition of the fuel cell system 10 as a whole. Namely, as compared with the favorable combination range 96, the operating point 130 as the combination of the moisture content and the SOC lies within the higher-SOC-side operating range 114, but the moisture content of the fuel cell 30 is outside the optimum range.

According to the related art, the vehicle may keep running only with the output of the storage device 14, without operating the fuel cell 30. In this case, the SOC of the storage device 14 becomes lower and lower, but the moisture content of the fuel cell 30 is kept at the same level. As a result, as shown in the enlarged view of FIG. 8B, the operating point goes beyond a higher-moisture-content boundary 113 of the higher-SOC-side operating range 114, and is located outside the higher-SOC-side operating range 114 as a part of the favorable combination range 96. Consequently, the fuel cell system is not able to generate the required power 92 even with the user's effort to generate the power 92.

According to the procedure of FIG. 4, an operation to improve the combination status is performed in step S18. More specifically, the moisture content of the fuel cell 30 is controlled to be within the optimum range, so that the operating point remains in the higher-SOC-side operating range 114 as a part of the favorable combination range 96. Here, the water distribution condition of the fuel cell 30 is improved, using the output of the storage device 14, so that the operating point 130 representing the actual combination is kept within the favorable combination range 114, and the moisture content of the fuel cell 30 is controlled to be within the optimum range. Namely, in this example, a purging operation is performed on the fuel cell 30, using the output of the storage device 14. The purging operation is implemented by the purging unit 32, and includes the step of increasing the rotational speed of the ACP (air compressor) 70, as describe above.

In the example of FIG. 8A and FIG. 8B, an operation to provide only the output of the storage device 14 so as to achieve the required power, without operating the fuel cell 30, is initially performed. As a result, the moisture content of the fuel cell 30 remains at the same level, and the SOC of the storage device 14 is reduced. Then, if the combination status reaches an operating point 132 immediately ahead of the boundary 113 or on the boundary 113, a purging operation is performed so as to reduce the moisture content of the fuel cell 30 and move the operating point indicative of the combination status in a direction parallel to the boundary 113. The purging operation may be performed using only the output of the storage device 14, or the power required by the purging operation may be allocated to the output of the fuel cell 30 and the output of the storage device 14. The operating point 134 indicates a condition resulting from the power allocating operation. With the power allocating operation thus performed, the combination status can be maintained within the favorable combination range, and the moisture content of the fuel cell 30 can be controlled to a preferable level, to be closer to the optimum range.

Figure 9:
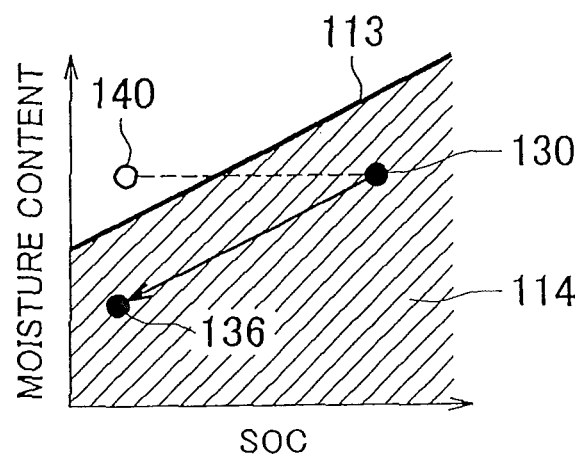
FIG. 9 is a view useful for explaining another example of power allocating method in the case of FIG. 8A.

FIG. 9 shows another example of power allocation. In this example, a purging operation is performed to move the combination status from the initial operating point 130 in a direction parallel to the boundary 113. The purging operation may be performed using only the output of the storage device 14, or the power required by the purging operation may be allocated to the output of the fuel cell 30 and the output of the storage device 14. An operating point 136 indicates a condition resulting from the power allocating operation. With the power allocating operation thus performed, the combination status can be maintained within the favorable combination range, and the moisture content of the fuel cell 30 can be controlled to a preferable level, to be closer to the optimum range.

FIG. 8A and FIG. 8B illustrate the case where the operating point 130 is located in the vicinity of the larger-moisture-content boundary 113 of the higher-SOC-side operating range 114, and the purging operation is performed on the fuel cell 30 in this case. To the contrary, in the case where the operating point 130 is located in the vicinity of a smaller-moisture-content boundary of the higher-SOC-side operating range 114, a hydrating operation is performed on the fuel cell 30. The hydrating operation is implemented by the hydrating unit 34, and includes the step of, for example, adjusting the opening of the back pressure regulating valve 72, or controlling the operation of the coolant circulating pump.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

The invention claimed is:

1. A fuel cell system for a vehicle, comprising:
   a fuel cell; and
   a controller programmed to estimate and acquire a water distribution condition of the fuel cell;
   wherein the controller acquires a state of charge of a storage device;
   wherein the controller is programmed to set a favorable combination range as a combination range in which a combination of the water distribution condition of the fuel cell and the state of charge of the storage device is suitable for a required power of the vehicle, according to predetermined criteria, and to determine whether an actual combination of the acquired water distribution condition and the acquired state of charge is within the favorable combination range, wherein the favorable combination range is obtained by adding a lower-state-of-charge-side operating range and a higher-state-of-charge-side operating range to an optimum range in which the water distribution condition of the fuel cell is within a recommended operating range and the state of charge of the storage device is within a recommended operating range;
   wherein the controller is further programmed to adjust the water distribution condition of the fuel cell using an output of the storage device when the actual combination is not within the favorable combination range, so as to move the actual combination to within the favorable combination range,
   wherein, even in a case where the water distribution condition is in a permissible operating range in which the fuel cell is operable without deteriorating characteristics of the fuel cell and the state of charge of the storage device is in a permissible operating range in which the storage device is operable without deteriorating characteristics of the storage device, the controller is further programmed to adjust the water distribution condition of the fuel cell using the output of the storage device when the actual combination is not within the favorable combination range in which a proportion between an output of the fuel cell and the output of the storage device is appropriately determined, so as to move the actual combination to within the favorable combination range; and
   wherein, even in a case where the water distribution condition of the fuel cell is within the recommended operating range, when the actual combination is not within the favorable combination range and the state of charge of the storage device is lower than the recommended operating range, the output of the storage device is intensively used early so as to perform a purging operation on the fuel cell.

2. The fuel cell system according to claim 1, wherein when the vehicle is started, or runs in a battery running mode with the output of the storage device, and the controller determines that the actual combination is such that the state of charge of the storage device is at a sufficient level, but the water distribution condition of the fuel cell is unsatisfactory, the controller improves the water distribution condition of the fuel cell, using the output of the storage device.

3. The fuel cell system according to claim 1, wherein when the vehicle is in a maximum output condition, or the fuel cell is in a transition from a condition where an operation of the fuel cell is halted to a condition where the operation is resumed, and the controller determines that the actual combination is such that the state of charge of the storage device is at an insufficient level, and the water distribution condition of the fuel cell is unsatisfactory, the controller improves the water distribution condition of the fuel cell, using the output of the storage device.

4. The fuel cell system according to claim 1, wherein when the water distribution condition of the fuel cell is an excessively high humidity condition, the controller operates an air compressor that supplies purge gas.

5. The fuel cell system according to claim 1, wherein the controller operates the air compressor that supplies the purge gas, when the state of charge of the storage device is at an insufficient level, and the water distribution condition of the fuel cell is an excessively high humidity condition.

6. The fuel cell system according to claim 1, wherein when the water distribution condition of the fuel cell is an excessively low humidity condition, the controller adjusts a degree of opening of a back pressure regulating valve of the fuel cell, so as to raise a back pressure of the fuel cell and improve the water distribution condition.

7. The fuel cell system according to claim 1, wherein when the water distribution condition of the fuel cell is an excessively low humidity condition, the controller controls an operation of a coolant circulating pump for the fuel cell, so as to lower the temperature of the fuel cell and improve the water distribution condition.

8. The fuel cell system according to claim 1, wherein the controller moves the actual combination to be within the optimum range.

9. A method of controlling a fuel cell system, comprising:
- estimating and acquiring a water distribution condition of a fuel cell;
- acquiring a state of charge of a storage device;
- setting a favorable combination range as a combination range in which a combination of the water distribution condition of the fuel cell and the state of charge of the storage device is suitable for a required power of a vehicle, according to predetermined criteria;
- determining whether an actual combination of the acquired water distribution condition and the acquired state of charge is within the favorable combination range, wherein the favorable combination range is obtained by adding a lower-state-of-charge-side operating range and a higher-state-of-charge-side operating range to an optimum range in which the water distribution condition of the fuel cell is within a recommended operating range and the state of charge of the storage device is within a recommended operating range; and
- adjusting the water distribution condition of the fuel cell using an output of the storage device when the actual combination is not within the favorable combination range, so as to move the actual combination to within the favorable combination range,
- wherein, even in a case where the water distribution condition is in a permissible operating range in which the fuel cell is operable without deteriorating characteristics of the fuel cell and the state of charge of the storage device is in a permissible operating range in which the storage device is operable without deteriorating characteristics of the storage device, the water distribution condition of the fuel cell is adjusted using the output of the storage device when the actual combination is not within the favorable combination range in which a proportion between an output of the fuel cell and the output of the storage device is appropriately determined, so as to move the actual combination to within the favorable combination range, and
- wherein, even in a case where the water distribution condition of the fuel cell is within the recommended operating range, when the actual combination is not within the favorable combination range and the state of charge of the storage device is lower than the recommended operating range, the output of the storage device is intensively used early-so as to perform a purging operation on the fuel cell.

* * * * *